Oct. 28, 1924.
R. D. EVANS
MEASURING SYSTEM
Filed Nov. 3, 1917
1,513,232
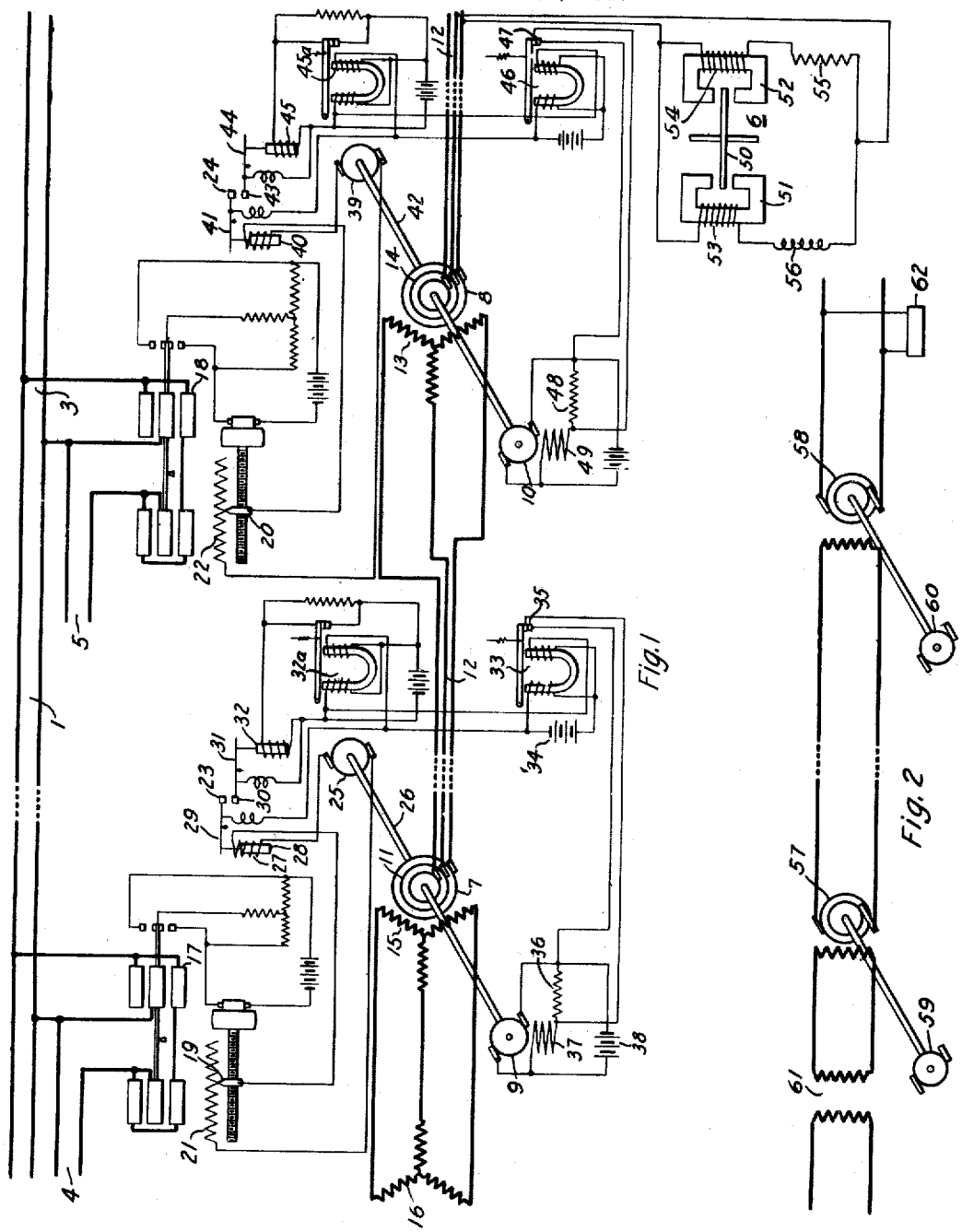
WITNESSES:
INVENTOR
Robert D. Evans
BY
ATTORNEY Patented Oct. 28, 1924.

1,513,232

UNITED STATES PATENT OFFICE.

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

MEASURING SYSTEM.

Application filed November 3, 1917. Serial No. 200,034.

*To all whom it may concern:*

Be it known that I, ROBERT D. EVANS, a citizen of the United States, and a resident of Wilkinsburg, in the county of Allegheny and State of Pennsylvania, have invented a new and useful Improvement in Measuring Systems, of which the following is a specification.

My invention relates to measuring systems and particularly to means for, and methods of, summing the amount of energy supplied to a circuit at a plurality of widely separated points.

One object of my invention is to provide means for summing a plurality of widely separated influences.

Another object of my invention is to provide means for summing quantities having characteristics that are independent of changes in temperature and resistance.

Another object of my invention is to provide a measuring system of the above-indicated character that shall be independent of the change in temperature, ohmic resistance and leakage resistance of its transmission conductors.

A further object of my invention is to provide a system of the above-indicated character that shall be inexpensive to construct and simple to operate.

Various systems have been provided for indicating, at a predetermined point, the total amount of power supplied to a system, at predetermined widely separated points. However, such systems, as heretofore provided, have not been entirely reliable because of the errors in transmitting the indications to the central measuring point. That is, changes in temperature, ohmic resistance and leakage resistance of the transmission conductors affected the readings and, consequently, no constancy of results was abtainable.

In my invention, I provide a plurality of means for generating voltages having frequencies proportional to the power being supplied to the circuit at the respective points. The generating means are so connected together that the resultant frequency is proportional to the sum of the power supplied to the system. Since the measured frequency is independent of temperature, ohmic resistance and leakage resistance changes in the transmission conductors, an accurate indication of the totalized energy input may be obtained.

Figure 1 of the accompanying drawings is a diagrammatic view of a measuring system embodying my invention, and Fig. 2 is a diagrammatic view of a modified form of measuring system embodying my invention.

An electrical transmission circuit 1 is supplied with energy at two points 2 and 3 from circuits 4 and 5, respectively. A measuring instrument 6 is provided, at a point remotely disposed with respect to the points 2 and 3, for the purpose of summing the energy input into the circuit 1.

The measuring system shown in Fig. 1 comprises, in general, two polyphase dynamos 7 and 8 having phase wound secondary windings that are adapted to be driven by motors 9 and 10, respectively, in accordance with the power traversing the circuits 4 and 5. The winding of the rotor 11 of the dynamo 7 is operatively connected, through conductors 12, to the stator winding 13 of the dynamo 8, and the winding of the rotor 14 of the dynamo 8 is operatively connected to the measuring instrument 6. The stator winding 15 of the dynamo 7 is supplied with energy from a source 16 of alternating current having a known frequency.

Wattmeters 17 and 18, of Kelvin balance or other suitable type, are operatively connected to the circuits 4 and 5, respectively, and are adapted to actuate movable contact members 19 and 20, respectively, that cooperate with resistors 21 and 22 for the purpose of controlling the position of movable contact members 23 and 24. The resistor 21 is connected in circuit with a magneto 25 that is mounted upon a shaft 26 upon which the dynamos 7 and 9 are also mounted and in series with the winding 27 of an electromagnet 28. The movable member of the electromagnet 28 is operatively connected to a lever arm 29 upon one end of which the contact member 23 is mounted. A contact member 30 is mounted on a pivotally-mounted arm 31 and is adapted to be periodically actuated through an electromagnet 32 from a vibrating relay 32a. The contact members 23 and 30 are adapted to control the energization of the relay 32a and also a relay 33 that is supplied with energy from a source 34 of electromotive force. The relay 33 is provided with contact members 35 that constitute a short-circuiting device for a resistor 36 which is connected in series with the field winding 37 of the motor 9. The contact members 35 are adapted to be closed when the contact members 23 and 30 are disengaged and to be opened when the contact members 23 and 30 are closed. The motor 9 is supplied with energy from a source 38 of electromotive force.

The resistor 22 is similarly connected in series with a magneto 39 and the winding 40 of an electromagnet that is adapted to actuate a pivotally-mounted lever arm 41 upon one end of which the contact member 24 is mounted. The magneto 39 is mounted on a shaft 42 upon which the dynamos 8 and the motor 10 are also mounted. The contact member 24 is adapted to be periodically engaged by a contact member 43 that is mounted upon a pivotally-mounted lever arm 44 which is actuated, through an electromagnet 45, from a vibrating relay 45a. The contact members 24 and 43 are adapted to control the relay 45a and also a secondary relay 46 the contact members 47 of which are adapted to short circuit a resistor 48 that is connected in series with a field winding 49 of the motor 10.

The meter 6 is a frequency meter and comprises a rotatable armature 50, stationary core members 51 and 52, windings 53 and 54, a resistor 55 and a reactor 56. The resistor 55 is connected in series with the winding 54 and the reactor 56 is connected in series with the winding 53, and the circuits, thus constituted, are connected, in parallel relation, to the conductors 12. The meter 6 is adapted to indicate the frequency of the measuring circuit and, consequently, any form of frequency meter may be used with equally accurate results.

Since the wattmeters 17 and 18 are adapted to control the positions of the contact members 23 and 24, through resistors 21 and 22 and the magnetos 25 and 39, the periodic engagement of the contact members 23 and 30 and 24 and 43, will so control the speed of the motors 9 and 10, through the relays 33 and 46, that the rotating members of the dynamos 7 and 8 will be actuated in accordance with the power traversing the circuits 4 and 5. Since the stator winding 15 of the dynamo 7 is energized from a source of electromotive force having known frequency and, since the dynamo 7 is driven at a speed proportional to the power being measured, an electromotive force will be induced in the winding of the rotor 11 having a frequency that varies in accordance with its speed and, consequently, in accordance with the power traversing the circuit 4. Similarly, the stator winding 13 of the dynamo 8 is excited from the winding of the rotor of the dynamo 7 and, since its rotor is actuated in proportion to the power traversing the circuit 5, the dynamo 8 will generate an electromotive force having a frequency that varies in accordance with the power traversing the circuit 5. However, the frequency of the voltage applied to the stator winding 13 will be equal to the sum of the frequency of the source 16 of electromotive force and the electrical speed of basic frequency, or electrical speed of rotation, of the rotor of the dynamo 7. Consequently, the frequency of the voltage, at the point of connection of the meter 6, is equal to the sum of the frequency of the voltage applied to the stator 13 plus the basic frequency of the electromotive force generated in the windings of the rotor of the dynamo 8, or, in other words, is equal to the frequency of the source 16 of electromotive force, the basic frequency induced in the rotor of the dynamo 7 and the basic frequency induced in the rotor of the dynamo 8. The meter 6 may be calibrated to indicate directly in watts or any other convenient unit. Since the speed of the motors 9 and 10 cannot be reduced to zero with the particular regulating devices illustrated, the meter 6 is so calibrated that its zero reading corresponds to the sum of the minimum frequencies.

By the term "basic frequency" I mean the frequency of such an electromotive force as would be generated in the rotor windings of the dynamos 7 and 8 if the primary windings 13 and 15 were energized to maintain a stationary magnetic field, as when energized by direct current.

In Fig. 2 of the drawings, single-phase dynamos 57 and 58 are adapted to be driven by motors 59 and 60, respectively, in accordance with the quantities to be summed. The dynamos 57 and 58 are single-phase, and the dynamo 57 is supplied with energy from a single-phase source 61 of electromotive force. By this arrangement, the frequency of the voltage applied to the stator winding of the dynamo 58 is equal to the difference between the frequency of the source 61 of electromotive force and the electrical speed of rotation of the rotor of the dynamo 57 and, consequently, the frequency at the point of connection of the meter 62 is equal to the frequency of the source 61 of electromotive force diminished by the electrical speeds of rotation of the rotors of the dynamos 57 and 58. While this system permits of the use of only two transmission conductors, the frequency of the source 61 of electromotive force must be sufficiently high to always ensure a resultant frequency at the point of connection of the meter 62.

My invention is not limited to the use of induction motors for generating the voltage having frequencies that vary in accordance with the quantities to be summed or to the number and variety of quantities to be summed, as various modifications and adaptations of my invention may be made without departing from the spirit and scope of the same, as set forth in the appended claims.

I claim as my invention:

1. In a measuring system, the combination with a plurality of measuring devices, of means controlled thereby to produce electromotive forces having frequencies varying in accordance with the instantaneous values of the quantities being measured by said devices and means for indicating a value proportional to the sum of the values of the frequencies.

2. In a measuring system, the combination with a plurality of measuring devices, of means controlled thereby to produce electromotive forces having frequencies varying in accordance with the instantaneous values of the quantities being measured by said devices, and means responsive to the sum of the values of the frequencies for indicating a value proportional to the sum of such values.

3. In a measuring system, the combination with a plurality of measuring devices, of means controlled thereby to produce electromotive forces having frequencies varying in accordance with the values of the quantities being measured by said devices, means for subjecting one of said frequency-producing means to the electromotive forces produced by another of said frequency-producing means to produce an electromotive force having a frequency corresponding to the resultant of the frequencies of both frequency-producing means, and means for measuring the resultant of the frequencies.

4. In a measuring system, the combination with a plurality of measuing devices, of alternating-current dynamos actuated in accordance with the indications of the respective measuring devices, means for electrically connecting the dynamos together to produce a resultant frequency, and means for indicating the resultant frequency of the system.

5. In a measuring system, the combination with a plurality of measuring devices of alternating-current dynamos actuated in accordance with the indications of the respective measuring devices, means for connecting the dynamo windings in cascade to produce a resultant frequency, and means for indicating the resultant frequency of the system.

6. The method of determining the summation of a plurality of electrical quantities which consists in generating an electromotive force having a frequency proportional to the instantaneous sum of the various quantities.

7. The method of determining the summation of a plurality of electrical influences which consists in generating an electromotive force having a frequency proportional to the instantaneous sum of the said electrical influences.

8. The method of summing, at a predetermined place, electrical quantities that are measured at other predetermined places which consists in generating an electrical force that has a characteristic which varies in accordance with the sum of the electrical quantities and that is unaffected by the resistance of the means for generating, transmitting or for measuring such characteristics.

9. In a measuring system, the combination with a plurality of widely separated power-measuring devices, of means respectively associated therewith for generating an electromotive force having a frequency proportional to the instantaneous value of the quantity being measured by the associated measuring device, means for combining the electromotive forces to establish an electromotive force having a frequency that is a resultant of the combined frequencies and that is proportional to the sum of the instantaneous values of the quantities being measured by the measuring devices, and means for indicating the sum of such values.

10. In a measuring system, the combination with a power-measuring device, of means for generating an alternating electromotive force, means operatively connected to the power-measuring devices for actuating the generating means in accordance with the indications of the measuring device, and means for indicating the frequency of the electromotive force.

11. In a measuring system, the combination with a plurality of power-measuring devices, of alternating-current dynamos actuated in accordance with the indications of the respective measuring devices, means for electrically connecting the rotor winding of one dynamo to the stator winding of the next to produce a resultant frequency, and means for indicating the resultant frequency of the said system.

12. In a measuring system, the combination with a plurality of cascade-connected phase-wound generators, of means for actuating the respective generators in accordance with the value of the respective quantities to be measured to produce a resultant frequency, and means for indicating the resultant frequency.

13. In a measuring system, the combination with a plurality of measuring instruments, of means for generating an electromotive force having a frequency proportional to the sum of their measurements, comprising a plurality of sources of variable frequency controlled individually by the measuring instruments and electrically interconnected.

14. A summation measuring system comprising a plurality of alternating-current cascade-connected dynamos actuated respectively in accordance with the value of the quantities the sum of which is desired, and means for indicating the frequency of the system.

15. In a measuring system, the combination with devices for severally measuring a plurality of quantities, of means severally controlled by the measuring devices to produce an electromotive force having a basic frequency corresponding to the value of the quantity of being measured, means for modifying the electromotive force of one of said means by the electromotive force of another of said means to cause the frequency of the former electromotive force to be a resultant of the basic frequencies of the electromotive forces generated by said means, and indicating means responsive to the resultant frequency.

16. The method of determining the resultant of a plurality of electrical forces which consists in generating an electromotive force having a frequency that varies in accordance with the instantaneous value of the resultant of said forces.

17. In a measuring system, the combination with a plurality of measuring devices, of means severally controlled thereby to generate an electromotive force having a frequency varying with the quantity measured by the associated device, and means co-operating with the generating means to render the frequency of the electro-motive force generated by one of said generating means dependent upon the frequency of the electromotive force generated by another of said generating means.

18. In a measuring system wherein a plurality of quantities are to be measured, the combination with a dynamo electric machine comprising stationary and movable windings, of means for energizing the stationary winding by an electromotive force having a frequency corresponding to the value of one quantity being measured and means for actuating the movable winding at a speed proportional to the value of another quantity being measured.

19. A measuring system comprising means for establishing a moving magnetic flux, a conducting member movable in the field of the moving flux and means for actuating the movable member at a speed proportional to a force being measured.

20. In a measuring system, the combination with a plurality of measuring devices, of a plurality of dynamo-electric machines associated therewith, means controlled by the measuring devices for controlling the speed of the dynamo-electric machines and means electrically associated with the electromotive force generated by one machine for controlling the electromotive force generated by another machine.

21. In a measuring system, the combination with a plurality of measuring devices, of a plurality of dynamo-electric machines associated therewith, means controlled by the measuring devices for controlling the speed of the dynamo-electric machines and means subjected to the effect of the electromotive force generated by one machine for influencing the electromotive force generated by another machine.

22. In a measuring system, the combination with a plurality of measuring devices, of a plurality of dynamo-electric machines associated therewith, means controlled by the measuring devices for controlling the speed of the dynamo-electric machines and means influenced by the electromotive force generated by one machine for controlling the production of a moving magnetic field responsive to the frequency of said electromotive force to control the electro-motive force generated by another machine.

23. In a power-measuring system, the combination with a plurality of measuring devices, of a plurality of dynamo-electric machines associated therewith and provided with exciting and generating windings, means responsive to the quantity measured by the measuring devices for controlling the speed of the associated machine and means for interconnecting the windings of the machines to subject the windings of one machine to the electromotive force generated by another machine.

24. In a power-measuring system, the combination with a plurality of measuring devices, of a plurality of dynamo-electric machines associated therewith and provided with exciting and generating windings, means responsive to the quantity measured by the measuring devices for controlling the speed of the associated machine, means for exciting the windings of one dynamo-electric machine and means for subjecting the exciting windings of another machine to the electromotive force generated by the generating windings of the first machine.

25. In a measuring system, the combination with a measuring instrument and a dynamo-electric machine provided with a stationary and a movable winding, of means for energizing one of said windings to produce a moving magnetic field and means for actuating the movable winding at a speed proportional to the value of the quantity measured by the instrument.

26. A totalizing system comprising a plurality of electro-responsive devices, a totalizing instrument, a transmission circuit extending between said devices and said totalizing instrument, means for energizing said transmission circuit, and means associated with said electro-responsive devices for altering a characteristic of the current traversing said circuit to cause said totalizing instrument to be actuated in accordance with the sum of the indications of the respective devices irrespective of changes in the resistance of the transmission circuit.

In testimony whereof, I have hereunto subscribed my name this 23rd day of Oct., 1917.

ROBERT D. EVANS.

Certificate of Correction.

It is hereby certified that in Letters Patent No. 1,513,232, granted October 28, 1924, upon the application of Robert D. Evans, of Wilkinsburg, Pennsylvania, for an improvement in "Measuring Systems," errors appear in the printed specification requiring correction as follows: Page 2, line 79, strike out the words "electrical speed of"; page 4, line 18, claim 15, strike out the word "of"; and that the said Letters Patent should be read with these corrections therein that the same may conform to the record of the case in the Patent Office.

Signed and sealed this 10th day of February, A. D. 1925.

[SEAL.] KARL FENNING,
*Acting Commissioner of Patents.*